United States Patent
Hawkins

[15] 3,653,704
[45] Apr. 4, 1972

[54] FASTENING MEANS FOR THE DOORS OF FREIGHT CONTAINERS, TRANSPORT VEHICLES AND THE LIKE

[72] Inventor: John Charles Hawkins, North Walsall, England

[73] Assignee: Rubery, Owen & Co., Limited, Darlaston, Wednesbury, Staffordshire, England

[22] Filed: July 24, 1970

[21] Appl. No.: 58,092

[30] Foreign Application Priority Data

July 26, 1969 Great Britain.....................37,656/69

[52] U.S. Cl.........................................................292/218
[51] Int. Cl.........................................................E05c 3/04

[58] Field of Search.............................292/218 M, 213, 214

[56] References Cited

UNITED STATES PATENTS

| | | | |
|---|---|---|---|
| 3,378,294 | 4/1968 | Olander | 292/218 |
| 3,434,751 | 3/1969 | Tantlinger et al | 292/218 |
| 3,329,456 | 7/1967 | Olander | 292/218 |

*Primary Examiner*—Richard E. Moore
*Attorney*—Scrivener, Parker, Scrivener and Clarke

[57] ABSTRACT

In fastening mechanism for the door of a freight container or transport vehicle in which an operating bar mounted on the door for angular movement about its axis carries on its ends cams co-operating with keepers on the door frame the cams and keepers are formed by sheet metal pressings.

4 Claims, 8 Drawing Figures

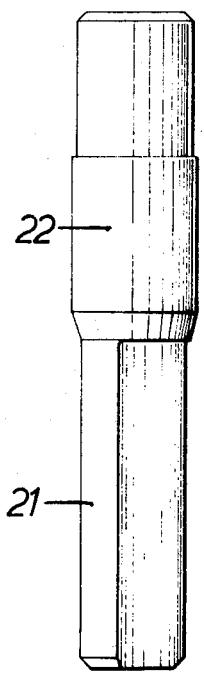
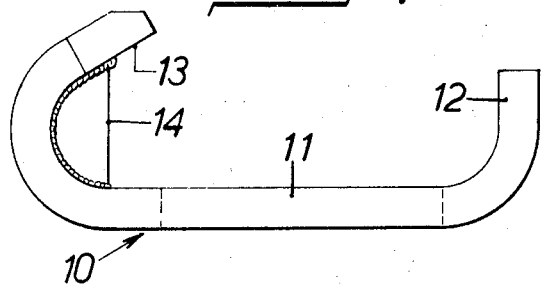
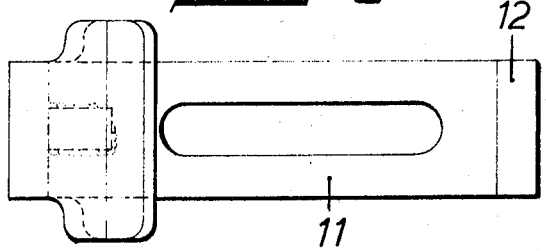
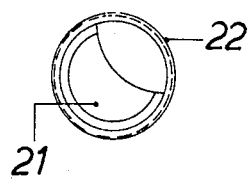

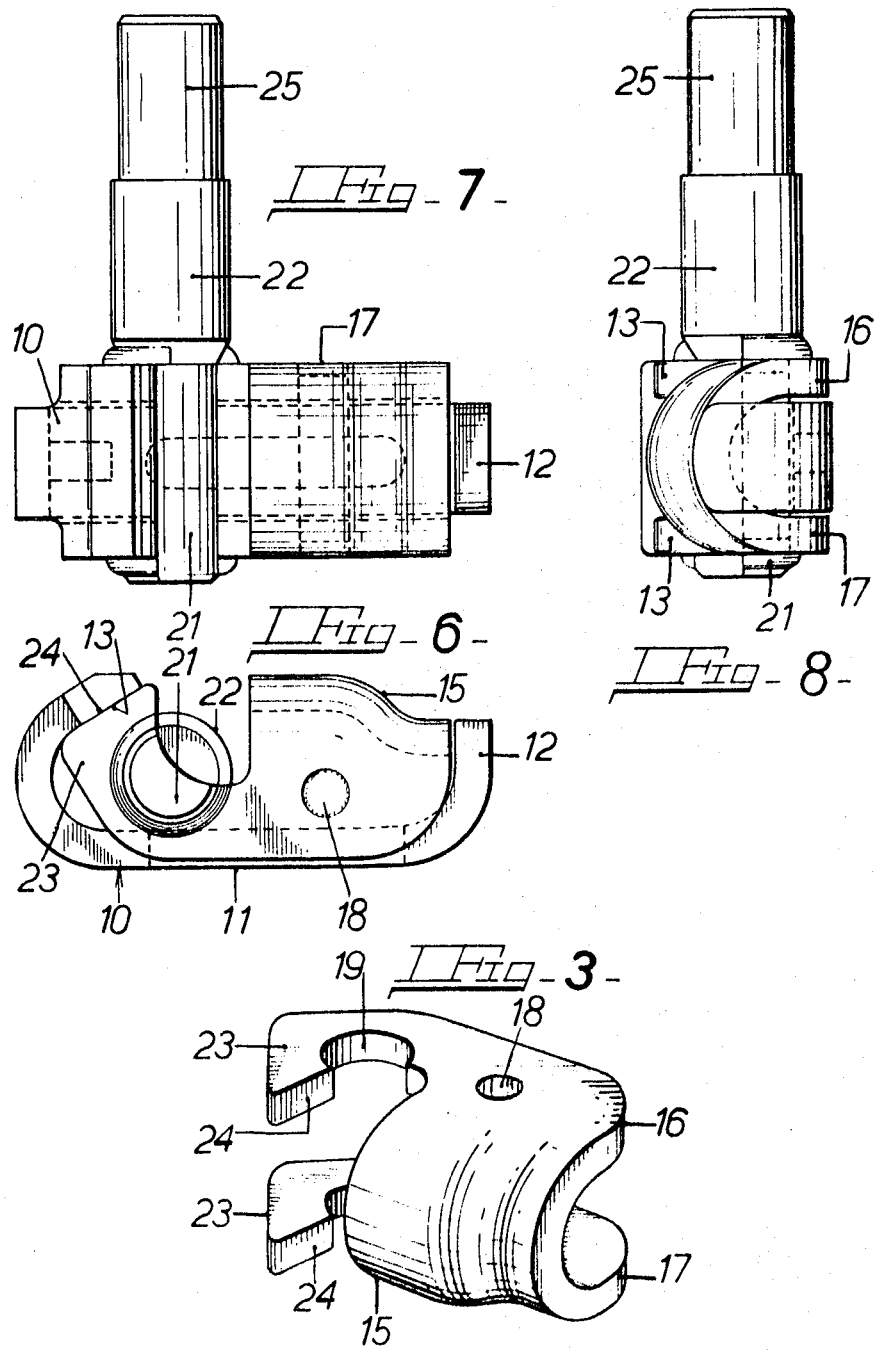

FASTENING MEANS FOR THE DOORS OF FREIGHT CONTAINERS, TRANSPORT VEHICLES AND THE LIKE

This invention relates to improvements in fastening means for the doors of freight containers or transport vehicles.

In order to reduce the amount of handling required when freight is moved from its source to its destination by two or more different forms of transport it is becoming common practice to transport goods in large containers in which the goods remain throughout their journey and which may be carried by road, rail, sea or air or by a combination of these in the course of a journey.

Such containers may have to stand up to very rough usage, particularly when they are being transferred from one form of transport to another. The containers, and particularly the fastening means for the doors, have to conform to very rigorous standards.

A freight containers is normally open at only one end which is provided with a single door or with two half doors hinged about one vertical edge to the frame at one side of the opening. For securing the door in the closed position a vertical operating bar is usually mounted on the door or on each half door for angular movement about its axis, and the bar carries at its top and bottom ends cams or equivalent fastening members adapted to engage with keepers mounted on the frame at the top and bottom of the door opening. The bar is moved angularly to engage or release the fastening members by a lever handle secured to it at an intermediate point in its length and co-operating with a hasp or keeper on the door to which it can be locked by a padlock or other key-operated locking means.

The cams or equivalent fastening means carried by the operating bar and the keepers with which they engage are usually manufactured as castings or forgings and are expensive and of considerable weight.

According to our invention, in fastening means of the kind set forth above both members of the fastening means are formed as sheet metal pressings. The keeper member which is secured to the door frame by any convenient means conveniently comprises an attachment plate of which one end is curved round forwardly and inwardly to provide a planar thrust face inclined at a small angle to the remainder of the plate, and the other member which is carried by the operating bar comprises a cam part for engagement with the thrust face on the keeper member and a U-shaped part adapted to fit over the attachment plate part of the keeper and to prevent relative movement between the two members in the plane of the door opening.

The cam member may be welded directly to the operating bar, but usually the operating bar will be formed by a length of steel tube and the cam member will be welded on to the outer end of a spindle of which the inner end is spigoted and welded into the end of the tube.

In the accompanying drawings we have illustrated by way of example one preferred form of cam and keeper member in accordance with our invention for fastening the door of a freight container.

In the drawings:

FIG. 1 is a plan of a keeper;

FIG. 2 is a front elevation of the keeper;

FIG. 3 is a perspective view of a cam for co-operation with the keeper shown in FIGS. 1 and 2;

FIG. 4 is an elevation of the spindle on which the cam is mounted;

FIG. 5 is an end view of the spindle;

FIG. 6 is a plan of the cam and keeper in full engagement;

FIG. 7 is a front elevation of the cam and keeper in full engagement; and

FIG. 8 is an end view of FIG. 5.

The keeper 10 shown in FIGS. 1 and 2 is formed from a blank of Tee outline, the stem of the Tee having straight parallel edges. In the finished pressing the main part 11 of the stem is flat and forms an attachment plate for securing the keeper to the frame of the container at the top or bottom of the door opening. The free end of the stem 12 is cranked forwardly at right angles to the attachment plate part. The other end, including the head of the Tee, is curved round forwardly through such an angle that the inner surface of the head presents a thrust face 13 of substantial width inclined inwardly and forwardly at an acute angle to the attachment plate part. A web 14 extends between and is welded to the thrust face and the attachment plate part to reinforce the thrust face against deflection away from the attachment plate part.

The cam member 15 shown in perspective in FIG. 3 is of U shape in cross-section over approximately half its length, the width between the inner faces of the limbs 16, 17 being such that this part is a minimum clearance fit over the attachment plate part 11 of the keeper, when the two members are engaged. The limbs of the pressing are reinforced against separation by a dowel pin 18 extending through and welded into the limbs. The clearance between the pin and the free edges of the limbs is substantially equal to the thickness of the attachment plate part of the keeper.

The limbs are extended at one end and are shaped as shown at 19 to receive the complementarily sectioned end 21 of the spindle 22 to which they are welded. The extremities of the limbs are then brought forwardly and terminate in spaced parallel lugs 23 having aligned parallel edges 24 inclined at the same angle to the free edges of the limbs 16, 17 as the thrust face on the keeper is inclined to the attachment plate.

The spindle 22 has a spigot end 25 which is welded into the end of an operating bar which is mounted on the door in the usual way for angular movement about its axis.

When the door is approaching the closed position and the operating bar is rotated the lugs 23 on the cam member enter under the thrust face 13 on the keeper member, and as the operating bar is turned into the locking position the lugs are forced against the thrust face and urge the door into the fully closed position. Movement of the cam member away from the thrust face in a direction parallel to the plane of the door is prevented by the forwardly cranked end of the keeper. The inclination of the co-operating surfaces 13, 24, on the cam member and keeper is such that in the fully closed position any force exerted on the door in a direction tending to force it open does not exert any torque or turning movement on the cam member in a direction tending to rotate the operating bar out of the locked position.

In the fully closed position of the two members the U-shaped part of the cam member engages with minimum clearance over the attachment plate part 11 of the keeper member and operates to prevent "racking" or relative movement between the door and the frame in a vertical direction while any relative movement in a horizontal direction is prevented by the confining of the cam member between the thrust face 13 on the keeper and the forwardly cranked opposite end 12 of the keeper.

I claim:

1. A fastening mechanism for a door of a freight container or transport vehicle in which a vertical operating bar mounted in bearings on the door for angular movement about its axis carries on its top and bottom ends cams which, on angular movement of the bar as the door is closing, engage with keepers on the frame of the container or vehicle at the top and bottom door opening, wherein a keeper comprises a sheet metal pressing incorporating an attachment plate part of which one end is curved round forwardly and inwardly to provide a planar thrust face inclined, inclined at an acute angle to the attachment plate part and the other end is cranked at right angles to the attachment plate part, and a cam for co-operation with said keeper comprises a sheet metal pressing incorporating aligned lugs having inclined parallel edges for engagement with the thrust face on the keeper and a U-shaped part adapted to fit over the attachment plate part of the keeper in the fully engaged condition of the cam and keeper.

2. Fastening mechanism as in claim 1 wherein the relative dimensions of said keeper and cam are such that in the fully engaged condition of these members the cam is confined between the thrust face on the keeper and the cranked opposite end of the keeper.

3. Fastening mechanism for a door of a freight container or transport vehicle in which a vertical operating bar mounted in bearings on the door for angular movement about its axis carries on its top and bottom ends cams which, on angular movement of the bar as the door is closing, engage with keepers on the frame of the container or vehicle at the top and bottom of the door opening, wherein the keepers and cams are formed as sheet metal pressings and at least one keeper comprises a flat attachment plate part of which one end is curved round forwardly and inwardly to provide a planar thrust face inclined at an acute angle to the attachment plate part for engagement by a complementary part of one end of a cam and the other end is cranked at right angles to the attachment part and provides an abutment for the other end of the cam.

4. Fastening mechanism for a door of a freight container or transport vehicle in which a vertical operating bar mounted in bearings on the door for angular movement about its axis carries on its top and bottom ends cams which, on angular movement of the bar as the door is closing, engage with keepers on the frame of the container or vehicle at the top and bottom of the door opening, wherein the keepers and cams are formed as sheet metal pressings and at least one cam comprises a U-shaped part adapted to fit over a part of a keeper and having at one end spaced aligned lugs with inclined edges for engagement with a complementary thrust face on a keeper when the cam is fully engaged with the keeper.

* * * * *